Oct. 2, 1928.
O. HETLESATER
1,686,236
INTERNAL COMBUSTION ENGINE
Filed June 16, 1926 3 Sheets-Sheet 1
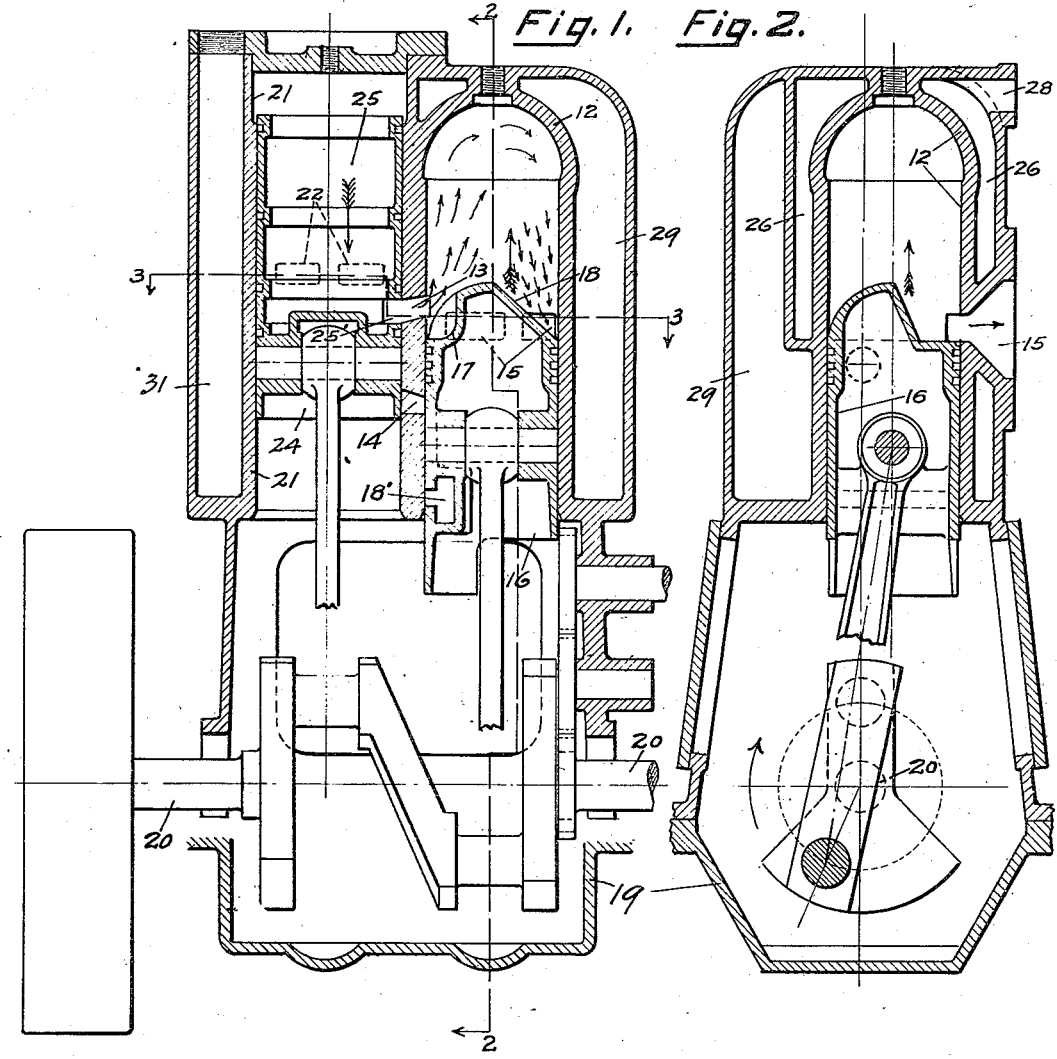
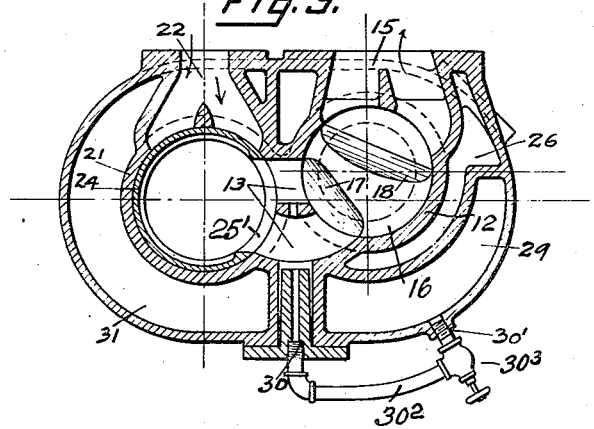
INVENTOR.
OLAF HETLESATER.
BY
ATTORNEY Oct. 2, 1928.
O. HETLESATER
1,686,236
INTERNAL COMBUSTION ENGINE
Filed June 16, 1926  3 Sheets-Sheet 2
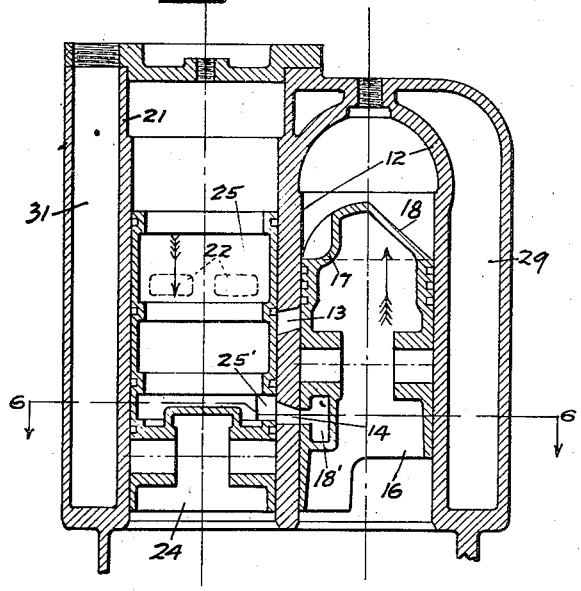
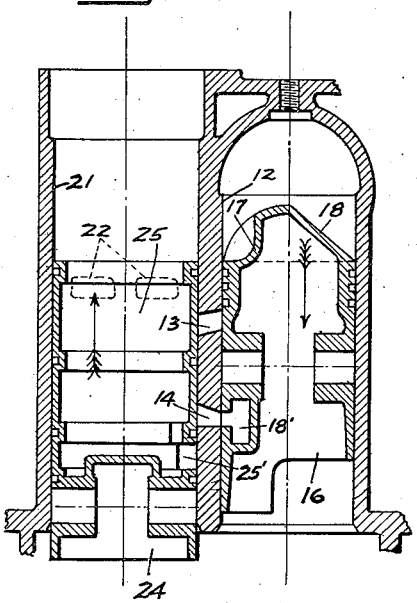
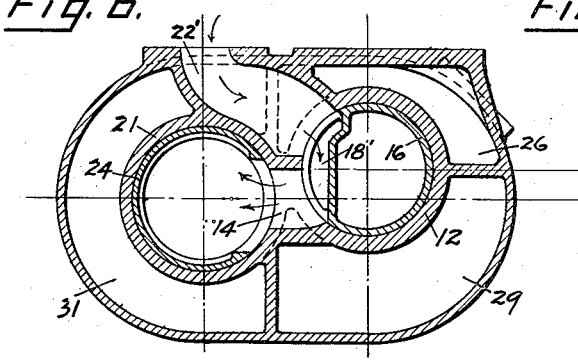
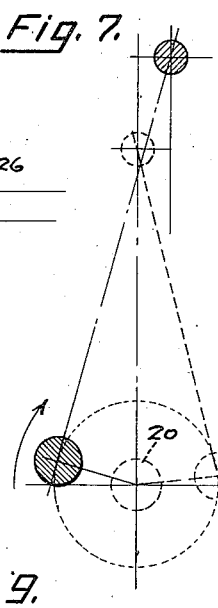
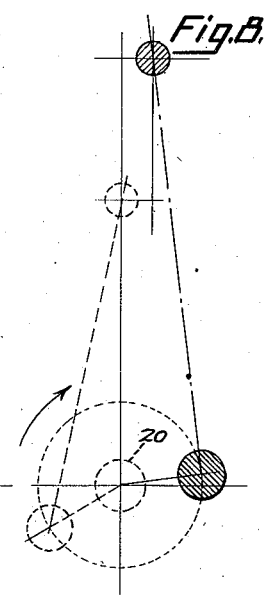
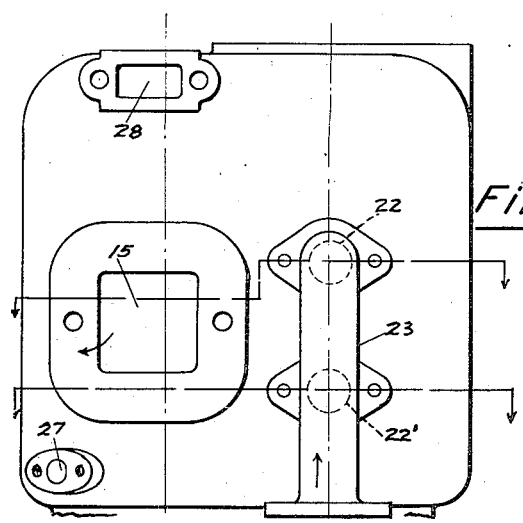
INVENTOR:
OLAF HETLESATER.
BY
ATTORNEY.

Oct. 2, 1928.
O. HETLESATER
1,686,236
INTERNAL COMBUSTION ENGINE
Filed June 16, 1926   3 Sheets-Sheet 3
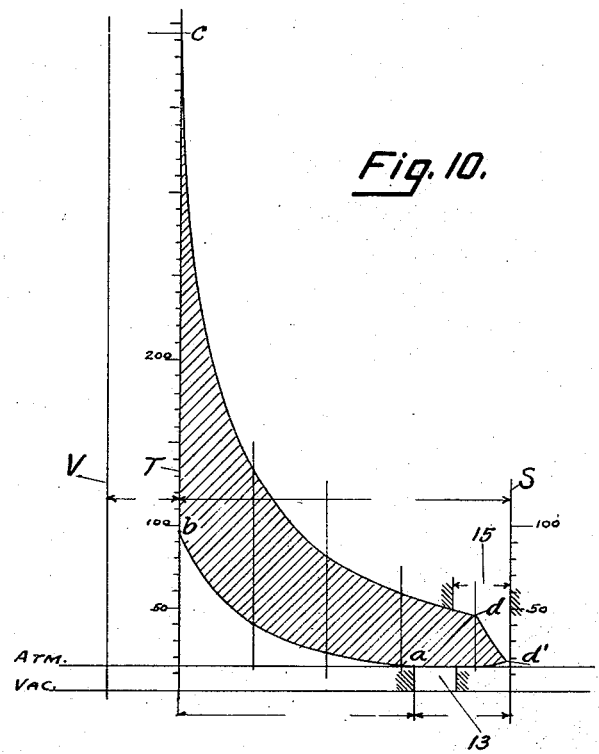
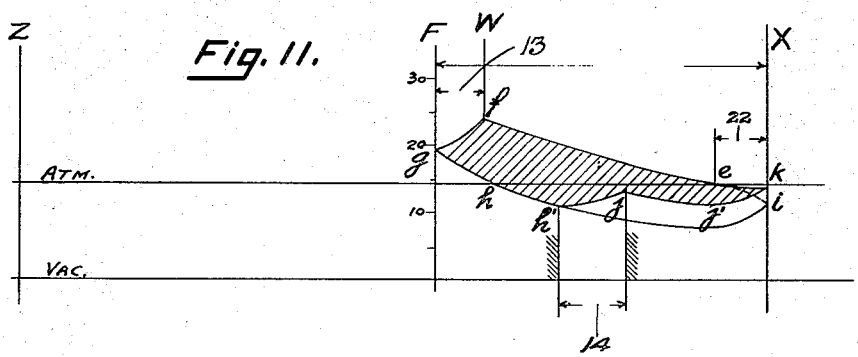
INVENTOR,
OLAF HETLESATER.
BY Pierre James
ATTORNEY.

Patented Oct. 2, 1928.

1,686,236

UNITED STATES PATENT OFFICE.

OLAF HETLESATER, OF SEATTLE, WASHINGTON, ASSIGNOR TO FULL EXPANSION MOTORS CORPORATION, OF SEATTLE, WASHINGTON, A CORPORATION OF WASHINGTON.

INTERNAL-COMBUSTION ENGINE.

Application filed June 16, 1926. Serial No. 116,761.

The present invention adapts the two-cycle engine to be used for all purposes for which the four-cycle engine has been employed.

To accomplish this, I arrange first, to allow more time for the exhaust, second, to have the compression period shorter than the expansion or power period, to increase power economy, third, to provide a higher pressure and greater temperature of the charging mixture, or in other words a surcharge, thereby making increased speed possible, and an increase of power in each engine of given gas consumption. In addition, this arrangement allows the entry into the power cylinder of a scavenging air between the period of exhaust and period of charge mixture admission. This prevents back firing in the charging cylinder and greatly improves conditions in the power cylinder, to make higher speed possible. These results I obtain, tend to make the engine containing my improvements, operable at lower speeds than have heretofore obtained in two-cycle engines, besides providing an efficient control at all speeds. The system shown of scavenging by air I omit in the smaller engines where compressed air is not available or would be too costly to produce. My engine will operate satisfactory without this scavenging, as the period allowed for exhausting before admitting gas mixture is longer than heretofore in ordinary two-cycle engines.

It may be further stated, that the arrangement to allow auxiliary suction from the carburetor to the charging cylinder, tends to relieve the vacuum caused by the downward stroke of the piston in this cylinder. Heretofore efforts have been made to accomplish similar objects by means of valves and more or less complicated arrangements of parts. I have sought to overcome this by a construction having no valves and a minimum of moving parts.

My invention relates to internal combustion engines of the two cycle type, and particularly to the engine illustrated and described in patent application, Serial No. 517,076 filed by me March 27, 1922.

The object of my invention, generally, is to improve the efficiency of engines of this character.

More specific objects and advantages of the invention will appear in the following description.

The invention consists in the novel construction, adaptation and combination of parts hereinafter described and claimed.

In the accompanying drawings, illustrating an embodiment of my invention,—

Fig. 1 is a vertical longitudinal sectional elevation through the centers of the power and charging cylinders. Fig. 2 is a vertical cross-sectional elevation through the power cylinder on line 2—2 of Fig. 1. Fig. 3 is a horizontal sectional view on the line 3—3 of Fig. 1. Fig. 4 is a vertical sectional view through both cylinders, showing open passage from intake through power piston into charging cylinder, the pistons moving in the arrow directions. Fig. 5 is a view similar to Fig. 4 with power piston in same position but on downward stroke. Fig. 6 is a horizontal sectional view on the line 6—6 of Fig. 4. Fig. 7 is a crank diagram for piston positions shown in Fig. 4. Fig. 8 is a like diagram related to Fig. 5. Fig. 9 is a rear elevation of both cylinders showing the intake manifold and the exhaust port. Fig. 10 is a diagram illustrating the power development. Fig. 11 is a diagram illustrating functions of the air cylinder.

Like characters refer to like parts in the views.

The engine herein shown is of the two-cycle type, with separate charging cylinder to mix, heat, and partially compress the gas mixture before passing same into the power cylinder.

The power cylinder 12 has a joint wall with the charging cylinder 21. The cylinder 12 has an intake port 13 and auxiliary port 14 through the joint wall, also an exhaust port 15, which ports are positioned with relation to each other and to the piston travel in each cylinder, as will subsequently appear.

In the cylinder 12 is a piston 16, the head of which has a curved baffling surface 17 opposing the port 13, and a deflecting surface 18 opposed to the exhaust port 15. Piston 16 also has a recessed passage $18^1$ communicating, on registering, between the fuel intake passage $22^1$, see Fig. 6, and port 14. This piston extends into the crank case 19 and has a connection with the crank shaft 20. Adjoining the cylinder 12 is the charging cylinder 21, with its aforesaid joint wall with the first named cylinder. The cylinder 21 has port 22, opening to the carburetor manifold 23, Fig. 9, and the already mentioned ports 13 and 14 in the joint wall. The passage 22¹, above mentioned, communicatively connects the port 14 with carburetor manifold 23. In the cylinder 21 is a piston 24 provided with an upwardly opening, recessed head 25, in the lower part of which is a port 25¹. The piston 24 has a connecting rod connection with the crank shaft 20. A circular water jacket 26 is formed about the upper part of cylinder 12, with an intake 27 and outlet 28.

Also provided in the peripheral wall of the cylinder 12 is a chamber 29 which serves as a reservoir for air received at a pressure say of about sixty pounds above atmospheric pressure from a source of supply, not shown. The air chamber 29 is provided with a leak hole 30¹, Fig. 3, from which communicative connection is had by means of a valved by-pass pipe 30² and a lead 30 with the fuel inlet port 13 to supply air into the latter. An oil chamber 31 is also provided.

The operation is as follows: With the pistons disposed as shown in Fig. 1, there is assumed to be substantially an atmospheric pressure in cylinder 12, or say a little above three pounds, due to resistance of ports and passages for exhaust. A quantity of pure air which was trapped in the port 13 is now discharged into cylinder 12, causing the forcing out of a part of the remaining exhaust gas, thereby reducing the exhaust gases therein to a minimum. The piston 24 being at its upward limit has uncovered port 13, and above which in the cylinder 21 is the explosive mixture, compressed to approximately ten pounds.

This mixture discharges into cylinder 12 and, as the piston 16 is on its upward stroke, it closes exhaust port 15 (Fig. 3) before the closing of the inlet port 13 by the piston 24 which is timed to close port 13 approximately at the same time, consequently at the time port 13 is about to close, the same pressure obtains in both cylinders, assumed to be substantially atmospheric. As piston 16 moves on its upward stroke it compresses the mixture charge in its cylinder to, say, about 96 pounds above vacuum. During this time the piston 24 has moved downwardly creating a partial vacuum in cylinder 21 until this piston 24 reaches the position in which it is shown in Fig. 4, whereupon the fuel intake, and ports 14 and 25¹ register to afford communication through piston passage 18¹, and the charging mixture enters, partially relieving the vacuum in the cylinder 21. Piston 24 having reached the end of its downward stroke, the carburetor port 22 is open and the cylinder 21 receives the full mixture charge, also filling the recess 25 in the piston head. At the same time, the mixture in cylinder 12 is ready to receive the ignition spark, as usual in this type of internal combustion engines.

Pressure in cylinder 12 rises to, say, 350 pounds, when the explosion occurs and drives the piston 16 downwardly until it opens exhaust port 15, thus allowing the exhaust to begin. Prior to this, the piston 16 has opened port 13, but its communication with cylinder 21 is still closed by piston 24, and pure air, under about 60 pounds pressure, has accumulated in this port passage when closed by both pistons.

When the piston 16 opens this port, as just stated, the air under pressure is forthwith discharged into cylinder 12, wherein the previous pressure has fallen, because of the exhaust discharge. The quantity of pure air, expanded to atmospheric pressure, released into the cylinder is sufficient to fill the space therein equal to the clearance volume, or to the volume between the cylinder head and limit line of the upward piston stroke.

The pressure of exhaust gases falls rapidly, from the moment the exhaust port begins to open, and thus allows the pure air to enter. This air is upwardly guided by the curved baffle surface 17 on piston 16, and the exhaust gases are aided in their quick escape towards port 15 by the opposing curved surface on piston 16. Thus is created a current of pure air passing upwardly on one side of the cylinder, and the burned gases are discharged downwardly on the opposite side, as indicated by darts in Fig. 1. It is apparent that the pure air forces a distinct separating division of cylinder space between the hot exhaust gases and the incoming mixture, which follows the air the moment piston 24 begins to uncover the port 13 and thus serves as a buffer body. Then, shortly before piston 16 has reached the end of its downward stroke, pressure in cylinder 12 falls to nearly atmospheric pressure or a few pounds thereover, due to back pressure caused by exhaust. This condition results in the speedy ejection of burned gases with some pure air, and the prompt refilling of the cylinder with a clean explosive mixture by the time piston 16 has closed port 13. The manner of supplying air to the port 13 to be trapped therein is by regulating a valve 30³ provided in the connection 30² with the air chamber 29 so as to permit a relatively slow feed of air into the port 13, the latter being filled during the period—say three-fourths of a rotation of the engine shaft 20— in which both pistons are in closed relations with respect to the port. The amount of air thus slowly supplied to the port 13 when the latter is uncovered is insufficient to materially dilute the combustible mixture passing through the port from the cylinder 21 into the cylinder 12 during the remaining one-fourth of the shafts rotation.

To further explain the principle of my invention, reference is had to the diagrams in Figs. 10 and 11. In Fig. 10, the distance between the lines S and T represents the length of stroke of the piston 16, and the distance between the lines T and V represents the clearance volume in cylinder 12, hereinbefore referred to. Exhaust port 15 and inlet port 13 are noted, both at the end of the stroke downward of the piston, and in related position to each other and to the cylinder.

Line $a$—$b$ indicates the compression curve caused by pressure of the piston 16 before ignition. Line $b$—$c$ indicates the increase of pressure caused by the explosion. Line $c$—$d$ indicates the expansion curve in the falling of pressure and temperature as the piston travels downwardly. Line $d$—$d^1$ indicates the exhaust curve—i. e., that of the abrupt fall in pressure and temperature to substantially atmospheric pressure, as the exhaust port opens. The shaded space inclosed between said lines represents the estimated development of power in the cylinder.

The distance from the upward wall of inlet port 13 to line T is the measure of the compression period, and the distance from the line T to line S is the measure of the expansion or power period. The pressure and temperature at the limit of compression stroke are obviously limited to avoid danger of preignition, consequently it is set at about 96 lbs. above vacuum. The clearance volume between lines T and V represents one volume, or a volume of gas therein at the time of explosion. It is thus apparent that the smaller this volume is, the greater will be the number of volumes of expansion, which may be attained in a cylinder of given dimension. For illustration, I have shown five volumes of expansion for the two-cycle engine. It is further apparent that if the compression period be reduced by placing port 13 further upwardly in the cylinder, or nearer the line T, the shorter may be the distance between the lines T—V. As the total distance from port 13 to line V represents the amount of gas mixture used per stroke, the more economical is the fuel consumption, the further upwardly port 13 is placed. This, of course, has limitations, for constructional reasons, varying in motors of different dimensions.

In Fig. 11 the saving in power required for the charging cylinder 21 is illustrated. Line X represents the downward stroke limit of piston 24. At such time the gas mixture is still being received into cylinder 21 through the intake port 22. As soon as the piston 24, on its upward stroke, closes port 22, compression ensues and continues in the cylinder 24 until near the end of said stroke, when the port 13 begins to open at line W. The volume of cylinder 21 above the piston, and within the piston recess, is the clearance volume, into which the gas mixture is compressed, and is represented by the space between lines W—Z. The compression is represented by line $e$—$f$, resulting in about 10 lbs. as previously stated.

As port 13 opens, the pressure falls rapidly toward the end of the upward piston stroke, designated by line $f$—$g$. On the downward stroke, pressure continues falling until port 13 is closed, and this is represented by line $g$—$h$. After port 13 is closed, pressure continues to fall until, at a certain point indicated by $h^1$ in the downward stroke, port 14 is opened and gas mixture is admitted through this port, piston recess $18^1$ and passage 22, from the carburetor. The partial vacuum is now filled and this filling is represented by line $h^1$—$j$, the piston moves on and pressure again falls, or a partial vacuum again ensues in cylinder 21, until port 22 opens, and this falling pressure is indicated by line $j$—$j^1$. As port 22 opens, this vacuum again fills and reaches nearly atmospheric condition near the limit of the downward piston stroke. As the piston makes its upward stroke, then, as long as the port 22 remains open the filling of vacuum will continue, increasing toward atmospheric pressure, which filling is represented by line $j^1$—$k$—$e$. Thereafter the same cycle is repeated. If now, the auxiliary port 14 did not exist, the condition would be as indicated by the lines $h^1$ to $i$ and $e$. A greater vacuum would then take place in cylinder 21 and the enclosed space between line $h^1$—$j$—$k$ and $h^1$—$i$ represents the saving in power accomplished by auxiliary port 14.

In order to have the auxiliary gas inlet port 14 closed by the power piston 16 during the period when piston 24 opens it in the compression stroke in charging cylinder 21, the crank connection with the power piston is arranged to be in advance of the piston 24 about 20 to 30 degrees, see Fig. 2, thus the openings $25^1$ and $18^1$ register with port 14 simultaneously during suction stroke in charging cylinder 21, but not during compression stroke.

This gives the advantage of efficiency, durability and simplicity, thus supplying an economical device in both construction and operation.

What I claim, is,—

1. In an internal combustion engine, the combination of a charging cylinder having a fuel intake port, an auxiliary fuel intake port, and a fuel outlet port, and a piston having a recessed head with a port therein reciprocatingly registrable with said auxiliary and outlet ports, said mechanism being arranged in a predetermined manner to allow a fuel mixture to be admitted first through the auxiliary port to relieve a partial vacuum following a cylinder discharge, closure of this port, and the piston to move on its downward stroke until the intake port opens, a predetermined total charge to be received, followed by closure of the intake port, compression of the charge, opening of the outlet port and the passage of the charge through same.

2. In an internal combustion engine of the two-cycle type having a power cylinder and a separate charging cylinder in which a carbureted air charge is mixed and heated by compression before entering the power cylinder, means including pistons in the respective cylinders for controlling, first, the admission of the combustible mixture into the power cylinder, second, the discharge of the exhaust gases from the power cylinder, and third, maintaining the charge mixture admitted into the power cylinder at atmospheric pressure after closing the exhaust to the atmosphere and until communication between said power and charging cylinders is effected by said pistons.

3. In an internal combustion engine, the combination of a power cylinder having a fuel intake port from a fuel charging cylinder, an exhaust port and an auxiliary fuel supply port into the charging cylinder, an independent port connecting with a source of fuel supply, and a passage extending from a source of compressed air supply to the intake port passage, a power piston having a recessed passage registrable with said auxiliary port and the independent port, and formed with relation to the aforesaid intake and exhaust ports, a charging cylinder having the aforesaid power cylinder intake and auxiliary ports, also an intake port connecting with a source of fuel supply, and a charging piston having a recessed head with a port therein reciprocatingly registrable with the power cylinder intake and auxiliary ports.

4. In an internal combustion engine, the combination of a power cylinder having a fuel intake port from a fuel charging cylinder, an exhaust port and an auxiliary fuel supply port into the charging cylinder, an independent port connecting with a source of fuel supply, also a passage extending from a source of compressed air supply to the intake port passage, a power piston having a recessed passage registrable with said auxiliary port and the independent port, also formed with relation to the aforesaid intake and exhaust ports, a charging cylinder having the aforesaid power cylinder intake and auxiliary ports, also an intake port connecting with a source of fuel supply, a charging piston having a recessed head with a port therein reciprocatingly registrable with the said power cylinder intake and auxiliary ports, and a shaft having cranks thereon for the respective pistons, which are connected with the opposing cranks at angles related to each other and to the cylinders, the power cylinder being offset from the charging cylinder, so that the auxiliary port will not register with the charging piston outlet port and the power piston auxiliary inlet port at the same time during the charging piston compression stroke.

5. In an internal combustion engine having a power cylinder and a charging cylinder, each of said cylinders being provided with an intake port and a discharge port, the discharge port of the charging cylinder constituting the inlet port of the power cylinder, pistons for the respective cylinders, said pistons being arranged and operated to cause the intake port of the power cylinder to begin to uncover first followed by opening of the exhaust port, thereafter opening the discharge port in the charging cylinder followed by the closing of the exhaust port in the power cylinder, thereafter closing the intake port in the power cylinder approximately simultaneously with the closing of the discharge port in the charging cylinder, causing a decreasing volume in the power cylinder counteracted by an increasing volume in the charging cylinder, thus permitting no compression to occur in power cylinder between the closing of the exhaust port and the closing of its intake port.

6. In an internal combustion engine having a power cylinder and a fuel charging cylinder with a communicating passage between said cylinders, said passage serving as the fuel discharge port for the charging cylinder and the fuel and air intake port for the power cylinder, said power cylinder having an exhaust port, means to supply air into said passage, and pistons provided in the respective cylinders and serving as valves for the cylinder ports, said pistons being arranged and operated to release air from said passage into the power cylinder while the exhaust port of the latter is open and prior to the uncovering of said passage with respect to the charging cylinder thereafter opening of the discharge port of the charging cylinder followed by closing of the exhaust port of the power cylinder, thereafter closing of the intake port of the power cylinder approximately simultaneously with the closing of discharge port of the charging cylinder, a decreasing volume in the power cylinder being compensated by an increasing volume in the charging cylinder, thus permitting no compression to occur in the power cylinder between the closing of its exhaust port and the closing of its intake port.

7. The combination with a reservoir of compressed air, of a power cylinder provided with an exhaust port and a combined air and charge-mixture intake port having restricted communicative connection with said reservoir, a piston serving as a valve with respect to both of said ports, a second piston serving as a supplementary valve for said intake port, said pistons being arranged to control said intake port whereby a small quantity of air from said reservoir is admitted into the cylinder in advance of the charge-mixture and serving as a buffer between the latter and the burned gases discharging from the exhaust port, said power piston first closing the exhaust port then closing the intake port, and means for preventing pressure within the power cylinder to rise above atmospheric pressure during the interval of time between the closing of the exhaust and intake ports by means of said power piston.

Signed at Seattle, Washington, this 31st day of December, 1925.

OLAF HETLESATER.